March 10, 1953
P. ROBINSON
2,631,180
ELECTRIC BATTERY
Filed July 31, 1951
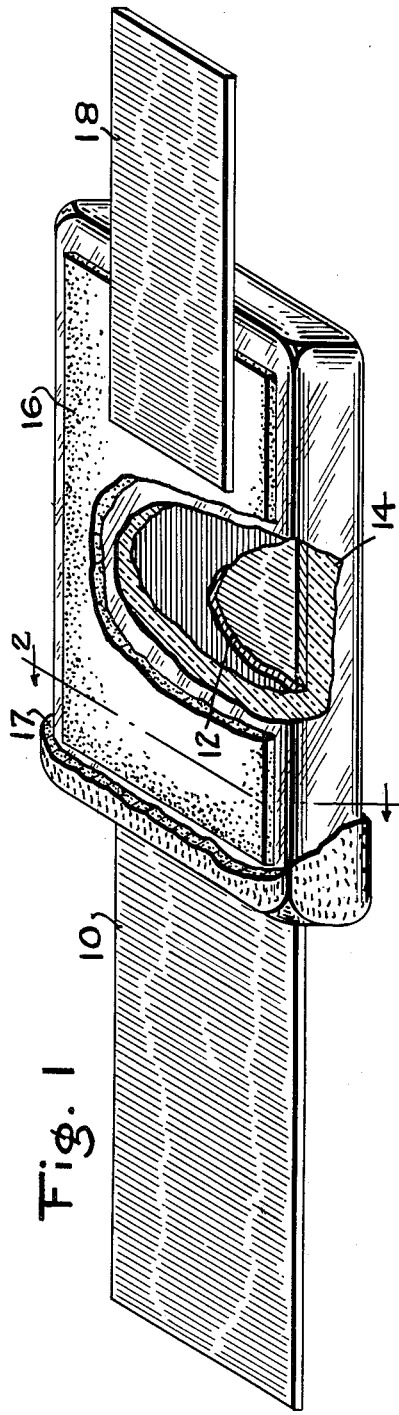
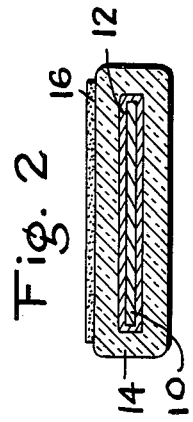
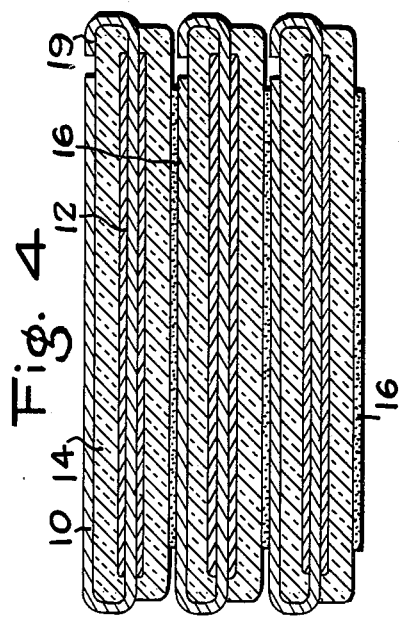
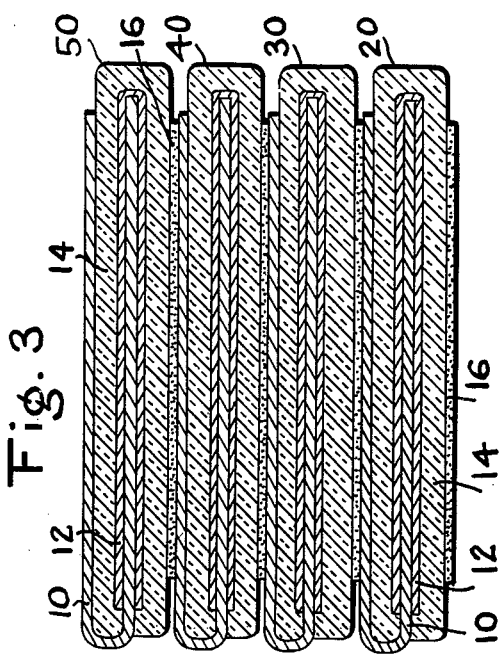
INVENTOR
PRESTON ROBINSON
BY Arthur C. Connolly
HIS ATTORNEY Patented Mar. 10, 1953

2,631,180

UNITED STATES PATENT OFFICE 2,631,180

ELECTRIC BATTERY

Preston Robinson, Williamstown, Mass., assignor to Sprague Electric Company, North Adams, Mass., a corporation of Massachusetts Application July 31, 1951, Serial No. 239,485

9 Claims. (Cl. 136—83)

This invention relates to electric batteries, more particularly to batteries that are suitable for supplying very small currents.

Among the objects of the present invention is the provision of novel electric batteries or primary cells which are particularly suited for delivering very small currents and are not appreciably injured or affected by intentional or accidental short-circuiting.

The above as well as additional objects of the present invention will be more readily understood from the following description of several of its exemplifications, reference being made to the accompanying drawings wherein:

Fig. 1 is a perspective view, with parts broken away, of one form of battery cell embodying the present invention;

Fig. 2 is a sectional view of the cell of Fig. 1 taken along line 2—2;

Fig. 3 is a sectional view of a stack of cells in accordance with a further embodiment of the invention; and Fig. 4 is a view similar to Fig. 3 of a still further exemplification of the invention.

According to the present invention there is provided a battery having an alkali metal anode such as metallic sodium or potassium, a glass envelope sealed around the alkali metal, an anode lead in contact with the anode and projecting out through the envelope, and an electrically conductive oxidizing agent in contact with the external surface of the glass envelope and spaced from the anode lead to form the cathode terminal of the cell. A plurality of these cells can be stacked in series connection to provide relatively high voltages. The glass of the envelope is a barrier electrolyte in the above type of cell and by reason of the relatively high resistance of the glass, only small currents are delivered by the cell, even when short-circuited.

In conformity with the usual nomenclature, the anode and cathode of the cell as defined in the present specification and claims are the electrodes at which the battery action develops negative and positive potentials, respectively.

One form of cell embodying the present invention is shown in Figs. 1 and 2 as formed of a strip of metal foil 10, one end of which is coated with a film of alkali metal 12 around which a glass coating 14 is sealed to entirely envelop the alkali metal. For this purpose the glass coating 14 may be fused to the foil 10 at the site where the foil projects out through the envelope.

To complete the cell, a coating of electrically conductive oxidizing agent 16 is applied in intimate contact with the outer surface of the envelope 14 to form the cathode terminal. Examples of such oxidizing agents are acidic metal oxides which are reducible to lower states of oxidation, such as Lead peroxide Higher uranium oxides such as $UO_3$, $U_3O_8$ Higher oxides of group V metals, e. g., bismuth pentoxide and antimony pentoxide Auric oxide Higher platinum metal oxides such as $PtO_3$, $IrO_2$, $OsO_4$, $PdO_2$, $RhO_3$, $RuO_4$ Tungsten trioxide Other suitable oxidizing agents are compounds such as silver chloride, which though not an oxide will electrolytically take up negative charges to provide negative ions.

Intimate contact between the external oxidizing agent and the glass can be obtained by making the application while the surface of the glass is heated to the point where it wets and causes the particles of oxidizing agent to stick in place. Where the oxidizing agent is not sufficiently stable at such temperatures, the oxidizing agent can be formed in place by first applying, as by spraying, condensing or sputtering, a film of the appropriate metal and then converting the metal, as by electrolytic or non-electrolytic oxidation, to the desired compound. If desired, the cathode may be oxidized in situ while the anode is being reduced.

The lead peroxide cathode material has an unusually high electrical conductivity and is accordingly preferred where a completely dry cell is desired. Oxidizing agents that do not show sufficient conductivity can be rendered sufficiently conductive by mixing them with finely-divided conductive material such as graphite, silver or other metal.

Wet cells can also be constructed in accordance with the present invention by providing a cathode material that is moistened with a suitable liquid. This liquid can act as a conductivity-increasing agent where the solid ingredient or ingredients of the cathode are not sufficiently conductive. Examples of solids suitable for this construction are:

Alkali metal salts of the more highly oxidized manganese, chromium and nitrogen acids e. g. potassium permanganate, sodium bichromate, and sodium nitrate;

Silver compounds such as silver oxide, silver chloride and silver nitrate;

Mercury compounds such as mercuric oxide, mercurous oxide, mercuric chloride, mercurous chloride.

The moistening liquid can conveniently be an aqueous solution of sodium chloride, or any other alkali metal ion transport medium. Water itself can also be used whether or not the solid cathode ingredients are appreciably soluble in it. It is preferred to have present in the wet cathode composition an ingredient that keeps the liquid from evaporating. With aqueous liquids, a hygroscopic sugar or deliquescent material such as a glycol or a salt like sodium acetate is quite effective.

In order to assure the flow of electrical current in the desired path, the surface of the glass envelope 14 may be coated as indicated at 17 with a material such as wax or organo-substituted polysiloxane (silicone) resin that has a very high surface resistivity. This can be used with the dry or wet form of cell.

The glass used may be of any conventional type such as ordinary soda-lime glasses or the low resistance glasses used for glass electrode acidity-measuring equipment. The glass can be preformed, as by blowing, into an envelope that is sealed around lead foil 10, or the foil can be merely dipped with molten glass so that a glass coat adheres. Where the adhesion does not provide an effective seal the end or ends of the coating can be given a subsequent firing treatment to completely fuse it to the lead 10.

The alkali metal anode 12 is conveniently provided by electrolyzing the glass-coated lead end in an electrolyte such as fused or aqueous solutions of sodium nitrate or other sodium salts. In the electrolyses the lead 10 is connected as the cathode and alkali metal is deposited apparently by reason of the movement of current-carrying alkali metal ions through the glass and/or from the glass to the cathode. Not more than about 10–15 volts is necessary to produce the desired deposit at temperatures of 200° to 350° C. although the time required varies from about 15 minutes to several hours depending upon the electrolyte temperature. If desired, the electrolyte can be a fused mixture of salts particularly where it is desired to lower the fusing point of the bath or increase its fluidity. Salts such as potassium or lithium nitrate, sodium, potassium or lithium chloride or the corresponding bromides, phosphates and nitrites can also be used either individually or in combination as electrolytes in dissolved or fused form.

Other alkali metals such as potassium, lithium, rubidium or cesium can be substituted for all or part of the sodium used as the anode. For this purpose the original glass coating can be a glass having the desired anode metal or metals as an effective ingredient. Inasmuch as sodium ions are more mobile than the other alkali metal ions, it will usually accompany these other metals when electrolytically deposited unless the sodium content is quite restricted.

To reduce the mechanical expansion stresses applied to the glass coating by reason of the deposition of alkali metal within it, the anode and/or coating can be provided with surfaces having indentations or other irregularities that keep the glass from fusing to the entire surface of the lead. This leaves small pockets that provide space for the accumulation of anode deposits. By way of example the anode lead can, before coating, be covered with convolutions of glass thread or fiber, or with a fine pattern of indentations, and the coating then applied under evacuation.

In any of the above constructions the oxidizing agent layer 16 can be itself used as a cathode terminal, or a separate cathode lead 18 can be connected as by soldering to a metallic layer sprayed on the layer of oxidizing agent. Furthermore, a cathode lead can be directly adhered to the glass and merely contacted with the oxidizing agent. Where wet cells are used, the wet cathode composition can be enclosed by an outer sheath of plastic material for example.

Fig. 3 illustrates a stack of cells 20, 30, 40, etc., according to the present invention with the cells connected in series for providing a high voltage. In this arrangement the dry cathode is limited to one face of the glass envelope, and the lead 18 is bent over the opposite face. With wet cells the enclosing sheath has no exterior coatings and no limited distribution of cathode is called for. The adjacent cell 30, constructed similarly to cell 20, has its cathode layer in contact with the anode lead of cell 20 and in turn has its anode lead engaged by the next cell 40. This stacking can be extended to the point where several hundred cells are connected in series to provide a relatively high voltage. The stacked cells are conveniently held together as by one or more dielectric straps. If desired, the individual anode leads can be adherently united to the connected cathodes, as by soldering in the manner indicated above.

Fig. 4 shows an alternative stacking technique. Here the anode lead 10 is provided with a tab 19 extended from the opposite end of the glass envelope 14 so that both tab 19 and the balance of the anode lead can be securely anchored to the cathode layer of an adjacent cell. The type of anchorage fixes the cells in place and dispenses with the need for a separate retaining device such as the above-mentioned straps.

In either of the above dry cell stacking arrangements the cathode layer can, if desired, be extended to all outer surfaces of the glass coating, and a dielectric stratum or sheet inserted to insulate it from the anode lead that is bent over it.

As many apparently widely different embodiments of this invention may be made without departing from the spirit and scope hereof, it is to be understood that the invention is not limited to the specific embodiments hereof, except as defined in the appended claims.

What is claimed is:

1. In an electric primary cell, an alkali metal anode, a glass envelope sealed around said anode, an anode lead in contact with the enclosed anode and projecting out through the envelope, and an electrically conductive oxidizing agent in contact with the external surface of the glass envelope and spaced from the anode lead, said oxidizing agent being the cathode terminal of the cell.

2. The combination as defined by claim 1 in which the alkali metal is a metal of the class consisting of sodium and potassium, and the glass is an anode metal glass.

3. The combination as defined by claim 1 in which the oxidizing agent is a dry acidic metal oxide that is reducible to a lower state of oxidation, and the remaining ingredients are also dry.

4. In an electric primary cell, a metallic sodium anode, a sodium glass envelope sealed around said anode, an anode lead in contact with the enclosed anode and projecting out through the envelope, and a lead dioxide coating in intimate contact with the external surface of the glass envelope and spaced from the anode lead, said coating being the cathode terminal of the cell.

5. An electric primary cell comprising an alkali metal anode, a glass envelope sealed around said anode, an anode lead in contact with the enclosed anode and projecting out through the envelope, and a lead peroxide coating in contact with the external surface of the glass envelope and spaced from the anode lead, said coating being the cathode terminal of the cell.

6. A cell as defined in claim 5 in which the alkali metal is a metal of the class consisting of sodium and potassium.

7. An electric primary cell which comprises an alkali metal anode, a glass envelope positioned around said anode, an anode terminal lead in contact with said anode and projecting out through said envelope, and an electrically conductive oxidizing layer in contact with the external surface of the glass envelope and spaced from the anode lead, said oxidizing agent being the cathode terminal of the cell, said oxidizing layer comprising an oxidizing compound and a moistening liquid.

8. An electric primary cell which comprises a flat alkali metal anode, a flat glass envelope sealed around said anode, an anode lead in contact with the enclosed anode and projecting out through the envelope, and an electrically conductive oxidizing agent in contact with one flat external surface of the glass envelope and spaced from the anode lead, said oxidizing agent being the cathode terminal of the cell.

9. A primary cell as defined in claim 8 in which said anode lead is bent over the uncoated flat surface of said glass envelope.

PRESTON ROBINSON.

REFERENCES CITED

The following references are of record in the file of this patent:

UNITED STATES PATENTS

| Number | Name | Date |
|---|---|---|
| 690,770 | Reed | Jan. 7, 1902 |
| 2,001,978 | Ruben | May 21, 1935 |

OTHER REFERENCES

Journal of Scientific Instruments, vol. 2, 1925, page 80 "Disc Batteries."